United States Patent [19]

Fox

[11] Patent Number: 5,309,172
[45] Date of Patent: May 3, 1994

[54] COMPUTER DATA AND COMMAND ENTRY DEVICE

[76] Inventor: Charles S. Fox, 474 Highcrest Dr., Wilmette, Ill. 60091

[21] Appl. No.: 737,311

[22] Filed: Jul. 29, 1991

[30] Foreign Application Priority Data

Jun. 14, 1989 [EP] European Pat. Off. ......... 89110777.3

[51] Int. Cl.$^5$ ............................................... G09G 5/08
[52] U.S. Cl. ...................... 345/159; 345/167
[58] Field of Search ............ 340/706, 709, 710; 178/18, 19; 400/715; 74/471; 345/157, 159, 167, 169

[56] References Cited

U.S. PATENT DOCUMENTS

| | | | |
|---|---|---|---|
| 4,369,439 | 1/1983 | Broos | 340/706 |
| 4,698,626 | 10/1987 | Sato et al. | 340/709 |
| 4,712,101 | 12/1987 | Culver | 74/471 XY |
| 4,724,715 | 2/1988 | Culver | 74/471 XY |
| 4,736,191 | 4/1988 | Matzke et al. | 340/709 |
| 4,799,049 | 1/1989 | Avila | 340/709 |
| 4,818,978 | 4/1989 | Kurihara et al. | 340/706 |
| 4,823,634 | 4/1989 | Culver | 340/706 |
| 4,896,554 | 1/1990 | Culver | 340/706 |
| 4,917,516 | 4/1990 | Retter | 340/710 |
| 4,928,093 | 5/1990 | Rahman | 340/709 |
| 4,931,781 | 6/1990 | Miyakawa | 340/711 |
| 4,933,670 | 6/1990 | Wislocki | 340/709 |
| 4,937,564 | 6/1990 | Oberg | 340/710 |
| 4,973,176 | 11/1990 | Dietrich | 340/710 |
| 4,976,407 | 12/1990 | Schwartz et al. | 400/715 |
| 5,021,771 | 6/1991 | Lachman | 340/709 |
| 5,048,784 | 9/1991 | Schwartz et al. | 400/715 |
| 5,049,863 | 9/1991 | Oka | 340/709 |

*Primary Examiner*—Jeffery Brier

[57] ABSTRACT

A multiple speed computer control device for use in providing touch commands from a user, comprising a roller ball and a roller assembly supporting the roller ball, wherein the roller assembly responds to pressure applied to the roller ball so as to produce a control signal. The invention further provides a method of controlling the speed of movement of a cursor on a display screen, comprising the steps of providing a control element, moving the control element to a first predetermined position corresponding to a first speed of movement of the cursor and moving the cursor at the first speed of movement in response to moving the control element to the first predetermined position. In another embodiment of the invention, an adjustable computer control device is provided, comprising a keyboard, a rotatable housing positioned in the keyboard, and a control positioned in the housing.

7 Claims, 2 Drawing Sheets

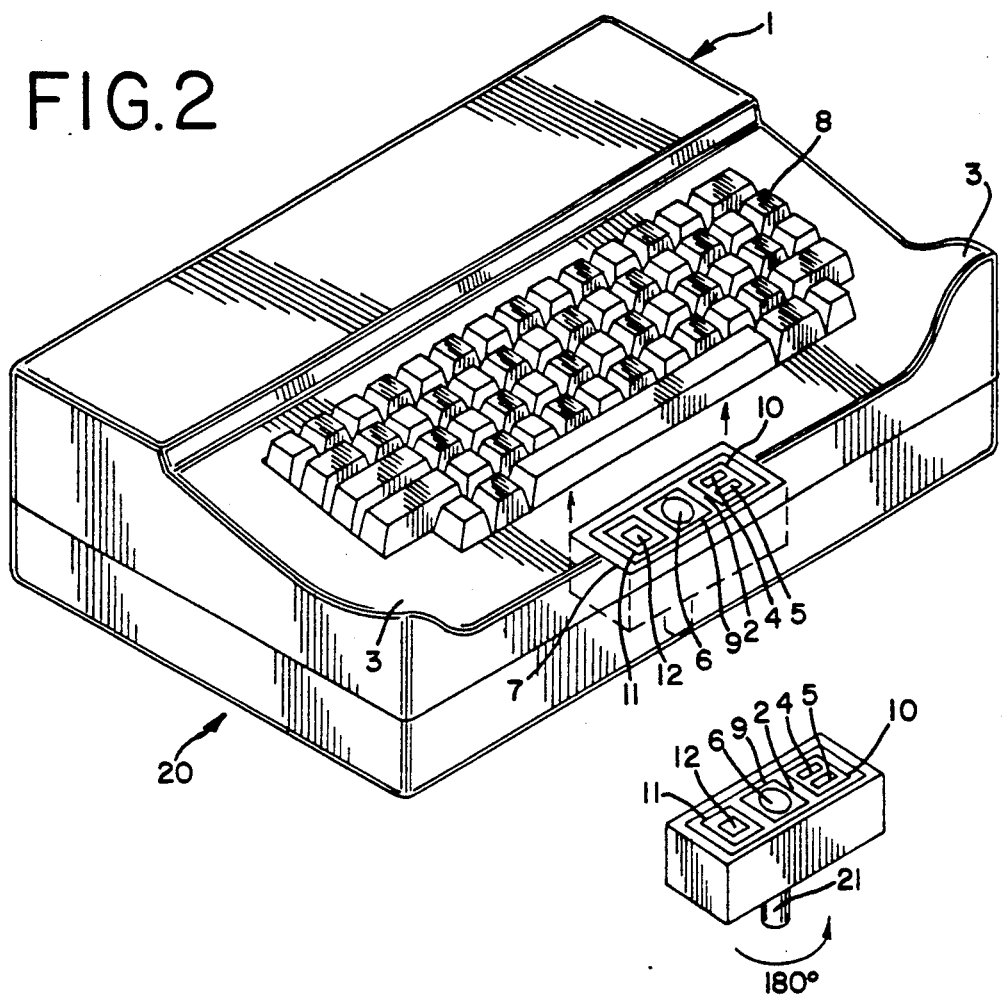
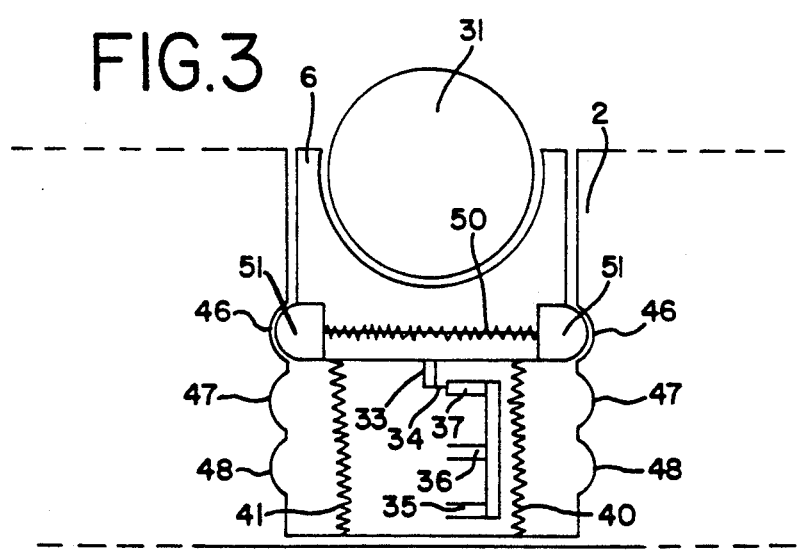

COMPUTER DATA AND COMMAND ENTRY DEVICE

BACKGROUND OF THE INVENTION

This invention relates to a novel process and device for entering data and commands into a computer. In most computer systems the operator uses a typewriter style keyboard to enter data and commands. The results of these inputs and commands are displayed on a CRT monitor. A "cursor" is used to locate the current position on the monitor where data are loaded or where commands are carried out. The position of the cursor is controlled in a variety of ways. Most computer systems use particular keystrokes or combinations of keystrokes to move the cursor around the screen of the monitor. In some systems special keys are designated to command the computer to move the cursor in particular directions, i.e. up, down, left or right. Other devices are also available to move the cursor such as joysticks, "mice," etc.

There are various disadvantages associated with each of these systems. The systems which use specially designated keystrokes to move the cursor are limited in the variety of tasks and the speed with which they can be used. This is because they can only move the cursor at one speed, in one direction, and only one character place at a time. This is so evidently limiting that many new computer operating systems now incorporate an additional device to move the cursor, usually a "mouse". However the mouse, while more versatile and faster, has inherent limitations of its own.

To those knowledgeable in the art the mouse is a device which provides signals to control the position of a cursor on the monitor display of computer systems. The mouse consists of a small housing fitted with a roller ball in its underside. Any movement of the "mouse" on a flat surface turns the roller ball. The roller ball is connected to sensing devices which register its movements. This sensing device is well known to those knowledgeable in the art and needs only a brief description here. As the mouse is moved over a flat surface in various directions the roller ball rotates. The roller ball's movement is appreciated by the sensors which then enter the positional data into the computer. The computer then moves the cursor on the monitor screen a distance which corresponds to the movement of the roller ball.

There are a number of inherent disadvantages to this system also. First, the mouse requires a relatively large flat surface adjacent to the computer keyboard upon which to operate. Therefore the mouse cannot easily be used where desktop space is limited. Similarly use with portable or "laptop" computers or with arcade games is very difficult.

The second major difficulty with using a mouse is the need for the operator to remove his or her hands from the keyboard in order to operate the mouse. This requires the operator to look away from the keyboard or monitor and to then visually locate the mouse. The operator must then move his hand towards the mouse, locate the mouse with his hand, and then place his hand correctly on the mouse. Now the operator is able to use the mouse to instruct the computer. After finishing his task with the mouse the operator must again remove his hand from the device he is using and visually locate the next device he wishes to use, in this case the keyboard. Next he must move his hand to the keyboard and locate the "home keys" to correctly position his fingers for use of the keyboard. All of these actions require time to complete and thereby reduce the efficiency of the operator.

A third difficulty is that the location of the cursor changes as the operator does his work while the computer "remembers" the cursor position for the mouse as being located at the last point that the mouse was used. When the operator wants to use the mouse at the current location on the screen he must first move the "mouse cursor" to the present work location before being able to use the mouse.

The present invention solves all of these problems. It eliminates the need for a relatively large flat surface adjacent to the computer keyboard upon which to operate and thereby makes it useful in new situations and activities, it eliminates many operator actions by enabling the operator to keep his hands on the home keys of the keyboard while using a device which performs the functions of the mouse thereby increasing efficiency of operation, and it provides a simple method of repositioning the mouse cursor position to the active screen position.

SUMMARY OF THE INVENTION

As presently configured the operation of the keyboard does not involve the use of the operator's thumbs. Therefore positioning the mouse controls in such a way that it can be operated by the thumbs without removing the operator's fingers from their home positions on the keyboard will enable the operator to use both devices most effectively and in a limited physical space. The mouse controls must be located near the natural resting place for the thumbs when the operator's fingers are on the home keys. The operator does not then have to locate either device to use them together.

However, simply positioning the new device for use by the operator's thumbs in itself is not sufficient to allow effective use of the newly coordinated mouse-board. A number of other innovations must be utilized.

First, the mouse must be broken into two separate units. One unit consists of the roller (which positions the cursor on the screen) and an adjacent switch which is also used to control the cursor position as will be explained below. The second unit consists of the other mouse switchs (which the computer operator uses to signal various commands to the computer). In this way the operator can control the cursor position with one thumb by using the roller and an adjacent switch, and signal instructions to the computer with the other thumb by use of the other mouse switches. Allocating these functions to separate thumbs achieves increased accuracy and efficiency because now the thumb that is controlling the cursor position is not simultaneously responsible for activating the switch, or switches that signal special instructions to the computer.

Second, the mouse roller and mouse switch must be located near the natural resting place for the thumbs when the operator's fingers are on the home keys. A natural "home position" for the thumbs is created and an adjustable rest position for the palms of the hand is also created to lower operator fatigue.

Third, the roller must be designed to have multiple speeds so that the cursor can both be rapidly moved to any place on the screen and can be positioned with a high degree of accuracy on the screen. A high speed mouse setting can move the cursor over the entire screen with little movement of the thumb while intermediate and slow speeds can ensure very accurate placement of the cursor. The speed of the cursor movement needs to be controlled by the same thumb that moves the roller. This is accomplished by having the speed of the mouse controlled by the amount of pressure applied to the roller by the thumb. Downward pressure on the roller will depress the roller assembly in its housing to activate an electromechanical switch that signals the computer to start the high speed mouse. A lower pressure will allow the roller to rise to a higher point in the housing and to activate a different electromechanical switch to signal a slower mouse speed to the computer. These speeds can be made to be flexibly adjustable by appropriate software or ROM operating system instructions.

Fourth, a switch located next to the roller (and activated by the same thumb that controls the roller) is designated to instruct the computer to relocate the mouse cursor position to the present active working position of the cursor on the screen.

Fifth, the second set of switches which carry different commands to the computer must be modified. The operator's other thumb is positioned over these two switches which can be programed in a variety of ways by appropriate software or ROM operating system instructions inherent to the computer. Regardless of the system used to operate these controls two different switches are necessary. The two switches are placed next to each other near the operator's other thumb's home resting position. They may have a number of uses. For example, one switch can be used to signal the computer to mark the location of the cursor while the other switch can command the computer to delete whatever has been marked by the combination of roller and switch operation previously done. Other commands can be allocated to these switches by appropriate software programming.

Sixth, the entire control device assembly is able to rotate 180 degrees to accomodate either right handed or left handed operators. In one configuration the roller is on the left hand side and the switches are on the right hand side, and in the rotated configuration the roller is on the right hand side and the switches are on the left hand side.

Seventh, palm rests are created at each end of the keyboard at the "natural resting" position of the palms to decrease operator fatigue.

The present invention can be used without substantial modification of existing technology. The present embodiment allows intuitive control of the cursor position, with intuitive proprioceptive feedback to the operator, which prior art consisting of shafts and roller mechanisms does not provide. With this combination of innovations, significant improvement of speed and ease of use of mouse driven software is achieved as well as the ability to use this technology in new applications.

BRIEF DESCRIPTION OF THE DRAWINGS

FIG. 2 is an exploded schematic view of an embodiment of the control device and the keyboard demonstrating the means of adjusting the device for left or right handed users.

FIG. 3 is an exploded schematic of an embodiment of the roller assembly to demonstrate the means of changing the speed settings of the control device.

DESCRIPTION OF THE PREFERRED EMBODIMENTS

Device

Figure 1:
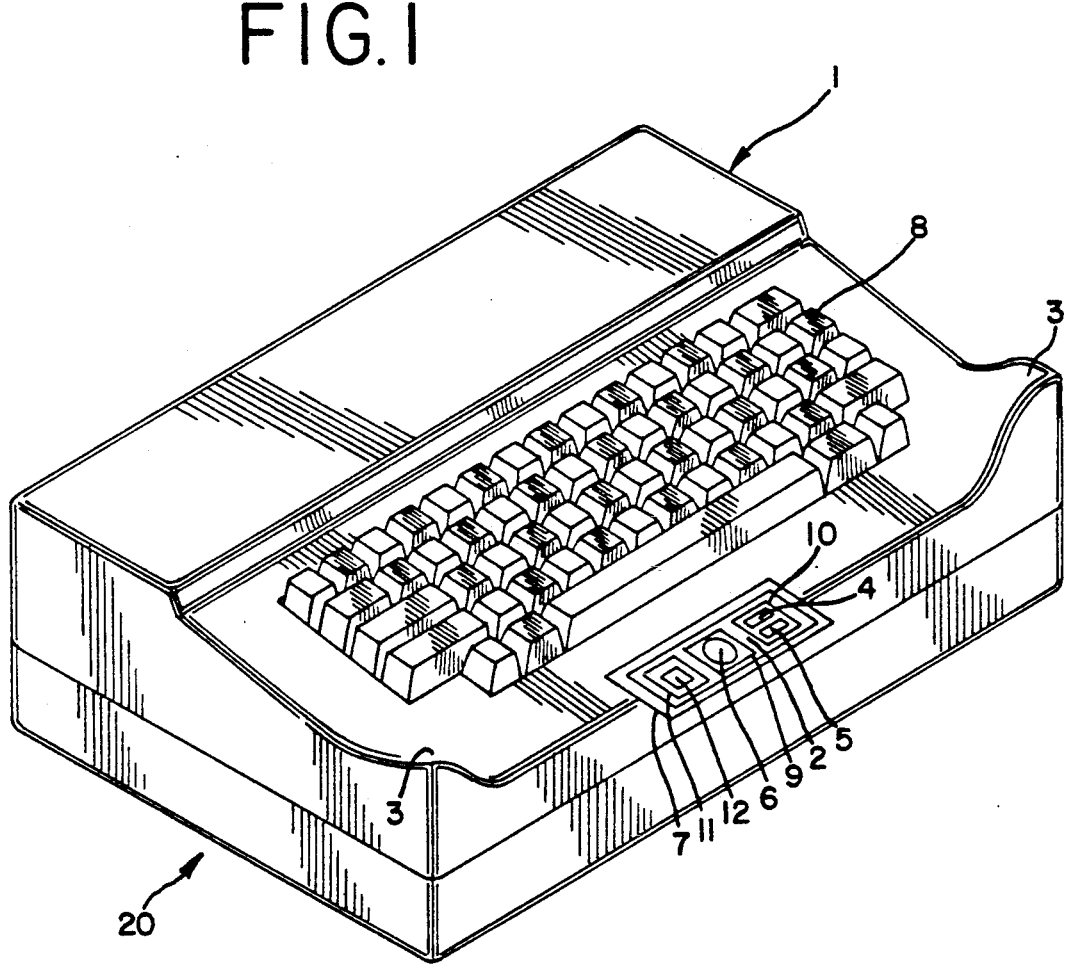
FIG. 1 is a perspective view of a computer keyboard showing how the computer control device is placed on the keyboard, the relative location of the roller assemble and switches, and the location and form of the palm rests. The location of the control device is at the front of the keyboard, centered from left to right and at the position where the thumbs of the operator would naturally rest when the operator's fingers are on the keyboard home positions.

FIG. 1 illustrates the preferred embodiment of the claimed invention represented generally by reference numeral 20. The computer control device 2 is located at the front of and centered from left to right on a standard computer keyboard 1. It can be either angled at approximately 30 degrees from the horizontal or located in a vertical position to improve ease of use. The control device is contained in its housing 7. The control device has a roller assembly 6 which is held in place by its housing 9. The two switches 4 and 5 are held in place by their housing 10. A third switch 12 is held in place by its housing 11. Two palm rest pads 3 are located at the right and left lower corners of the computer keyboard and their height is adjustable to accomodate the comfort of each individual operator.

FIG. 2 illustrates the preferred embodiment of the claimed invention 20 showing its ability to be adjusted for use by both left and right handed operators by reference numeral 21. The computer control device 2 is extended on its shaft 21 away from the control device housing 7. The control device 2 is able to rotate 180 degrees around the axis of the shaft 21 when in the extended position. The roller assembly can thereby be located either to the right of the switches 4 and 5 or to the left of these switches. After this adjustment is made the control device 2 is lowered back into it's resting position in the control device housing 7.

FIG. 3 is a schematic view of the roller assembly 6. It consists of the roller ball 31, a spring 50, two protrusions 51 attached to the spring and the spaces 46, 47 and 48, which are molded into the control device 2, two springs 40 and 41, a metal rod 33, a contact 34 and three switch position contacts 35, 36, and 37. As pressure is applied in a downward direction to the roller assembly, the protrusions 51 are moved towards each other because of the shape of the molded input device 2. This compresses the spring 50. Further pressure moves the roller assembly 6 downwards until the protrusions 51 are able to move into the space 47 molded into the control device 2. When the roller assembly 6 has descended this far into the control device 2 the rod 33 and the contact 34 have also descended the same distance which causes switch 37 to be inactivated and switch 36 to be activated. This system provides the operator with positive proprioceptive data telling him where the roller assemble is and which switch is activated. A similar sequence of events inactivates switch 36 and activates switch 35. A release of pressure by the operator allows this sequence of events to be reversed and the operator can thereby easily and accurately control which switch is activated in the control device.

Clearly many modifications of this basic system can be made as to how the switches are constructed, how the position of the roller assembly is controlled, how the control device may be constructed so as to be able to rotate in its housing and precisely where the palm rests and controls should be placed.

Method

FIG. 1 illustrates the complete control device system. The initial adjustment consists of setting the height of the palm rests for optimal comfort of the operator and rotating the control device for either left or right handed operators as described above. The operator will then locate his finger on the home keys of the standard keyboard to begin entering data into the computer. His left and right thumbs are located respectively upon the roller (6) and one of the switchs (4 or 5). His palms are resting on the palm rests (3). When he needs to use the computer control device (2) his thumbs are already in position and there is no need to either locate the device nor to remove his fingers from the keyboard home keys. Rotating the roller in the highest position moves the cursor position around the screen at the slowest speed. The exact speed can be flexibly adjusted by appropriate software. At this setting a 120 degree rotation of the roller should move the cursor approximately 5% of the distance across the screen either horizontally or vertically. This is approximately the space that four or five letters or numbers would take up. This provides for very accurate placement of the cursor. When the operator presses down on the roller and puts it into its lowest position the cursor speed will be the fastest. In this setting a 120 degree rotation of the roller (6) should move the cursor across the entire screen either horizontally or vertically. The middle position of the roller assembly will set the cursor speed at an intermediate level to provide relatively rapid movement of the cursor with intermediate accuracy in its placement. The two switches (4 and 5) can be set up with appropriate software controls to perform a variety of functions. As an example, for word processing one switch can be used to "mark" the location of the cursor when it is activated and the other switch can be used to instruct the computer to delete whatever has been "marked." The other switch 12 is used prior to use of the roller assembly in order to instruct the computer to relocate the mouse cursor position to the present active working position on the screen.

I claim:

1. A multiple speed cursor control device for use in providing touch commands from a user, comprising:
   a roller ball;
   a roller assembly supporting said roller ball, wherein said roller assembly responds to pressure applied to said roller ball so as to move in a vertical direction and produce a control signal;
   a computer to receive said control signal; and
   a display connected to said computer for displaying a movable cursor, wherein said control signal controls the speed of movement of said cursor on said display.

2. The multiple speed cursor control device of claim 1, comprising a first switch for generating said control signal so that said cursor moves at a first speed.

3. The multiple speed cursor control device of claim 2, comprising a second switch for generating said control signal so that said cursor moves at a second speed.

4. The multiple speed cursor control device of claim 1, wherein said roller assembly comprises a first spring and a first protrusion attached to said first spring.

5. The multiple speed cursor control device of claim 4, wherein said roller assembly comprises a second protrusion attached to said first spring.

6. The multiple speed cursor control device of claim 4, comprising a first space which engages said first protrusion upon movement of said roller assembly a first distance along said vertical direction.

7. The multiple speed cursor control device of claim 6, comprising a second space which engages said first protrusion upon movement of said roller assembly a second distance along said vertical direction.

* * * * *